United States Patent
Gerke

(10) Patent No.: US 7,704,037 B2
(45) Date of Patent: Apr. 27, 2010

(54) DEVICE FOR DESTACKING CUBIC PRINTED PRODUCTS

(75) Inventor: Klaus Gerke, Bassum (DE)

(73) Assignee: Kolbus GmbH & Co. KG, Rahden (DE)

( * ) Notice: Subject to any disclaimer, the term of this patent is extended or adjusted under 35 U.S.C. 154(b) by 258 days.

(21) Appl. No.: 11/601,424

(22) Filed: Nov. 17, 2006

(65) Prior Publication Data

US 2007/0147980 A1 Jun. 28, 2007

(30) Foreign Application Priority Data

Dec. 23, 2005 (DE) ........................ 10 2005 062 198

(51) Int. Cl.
*B65H 3/00* (2006.01)

(52) U.S. Cl. .............. 414/797.6; 414/795.7; 414/795.8; 414/923; 271/35

(58) Field of Classification Search ................. 198/560, 198/468.2–468.4, 418.2–418.4, 370.07, 370.08; 221/11, 218, 153, 35, 104, 241; 414/788.9, 414/795.7, 795.8, 796.1, 797.2, 797.4, 797.6, 414/797.7, 797.8, 797.9, 798; 271/220–224
See application file for complete search history.

(56) References Cited

U.S. PATENT DOCUMENTS

| | | | | | |
|---|---|---|---|---|---|
| 1,632,203 | A | * | 6/1927 | Threefoot et al. | 193/35 A |
| 2,667,959 | A | * | 2/1954 | Rogers | 198/416 |
| 2,667,979 | A | * | 2/1954 | French | 414/796.4 |
| 3,027,021 | A | * | 3/1962 | Kramer | 414/788.8 |
| 3,189,156 | A | * | 6/1965 | Hyer et al. | 198/456 |
| 3,208,605 | A | * | 9/1965 | Burke | 414/795.7 |
| 3,422,970 | A | * | 1/1969 | Faerber | 414/795.7 |
| 3,599,807 | A | * | 8/1971 | Hedrick et al. | 414/788.3 |

(Continued)

FOREIGN PATENT DOCUMENTS

DE 198 11 635 A1 9/1999

(Continued)

*Primary Examiner*—Gregory W Adams
(74) *Attorney, Agent, or Firm*—Alix, Yale & Ristas, LLP

(57) ABSTRACT

A device for destacking books, brochures, or similar cubic printed products (2), wherein said device comprises a separating belt (6) that is powered by a controllable drive and serves for the cyclic separation of the respective bottom printed product (2a) from the stack (3a), lateral boundaries (8a, b) that can be adjusted to the respective format and position the stack (3a) on the separating belt (6), a height-adjustable retaining element (9) that forms a passage for the respective printed product (2a) to be separated, a support (10) in the infeed region of the separating belt (6) in order to support the rear edge of the printed product (2) lying on top of the bottom printed product during the separation of the bottom printed product (2a), and a feeding belt (5) that is arranged upstream of the separating belt (6) and serves for delivering the next stack (3b) into the separating position. In order to reliably and flawlessly separate, in particular, thick book blocks with a small format from high stacks, the destacking device (1) features at least one supporting element (15a, b) that is arranged at a defined distance behind the stack (3a) and can be moved out of the transport path during the delivery of the next stack (3b). The supporting element automatically moves out of the transport path during the delivery of the next stack (3b).

17 Claims, 1 Drawing Sheet

U.S. PATENT DOCUMENTS

| | | | | |
|---|---|---|---|---|
| 3,622,149 | A | * | 11/1971 | Enskat ........................ 271/35 |
| 3,690,475 | A | * | 9/1972 | Pfaffle ..................... 414/796.1 |
| 3,991,888 | A | * | 11/1976 | Beckius et al. ........... 414/795.8 |
| 4,710,089 | A | * | 12/1987 | Schneider ................ 414/795.7 |
| 5,026,250 | A | * | 6/1991 | Hofer ..................... 414/796.1 |
| 5,388,954 | A | * | 2/1995 | Marinoni et al. ......... 414/795.7 |
| 5,573,368 | A | * | 11/1996 | Freudelsperger ......... 414/795.8 |
| 5,888,047 | A | * | 3/1999 | Auerbach et al. ........ 414/797.8 |
| 6,231,299 | B1 | * | 5/2001 | Newsome et al. ........ 414/788.9 |
| 6,863,173 | B2 | * | 3/2005 | Bennett ...................... 198/416 |

FOREIGN PATENT DOCUMENTS

| | | | |
|---|---|---|---|
| DE | 19811635 A1 | * | 9/1999 |
| GB | 2 148 260 | | 10/1984 |
| JP | 08020435 A | * | 1/1996 |

* cited by examiner

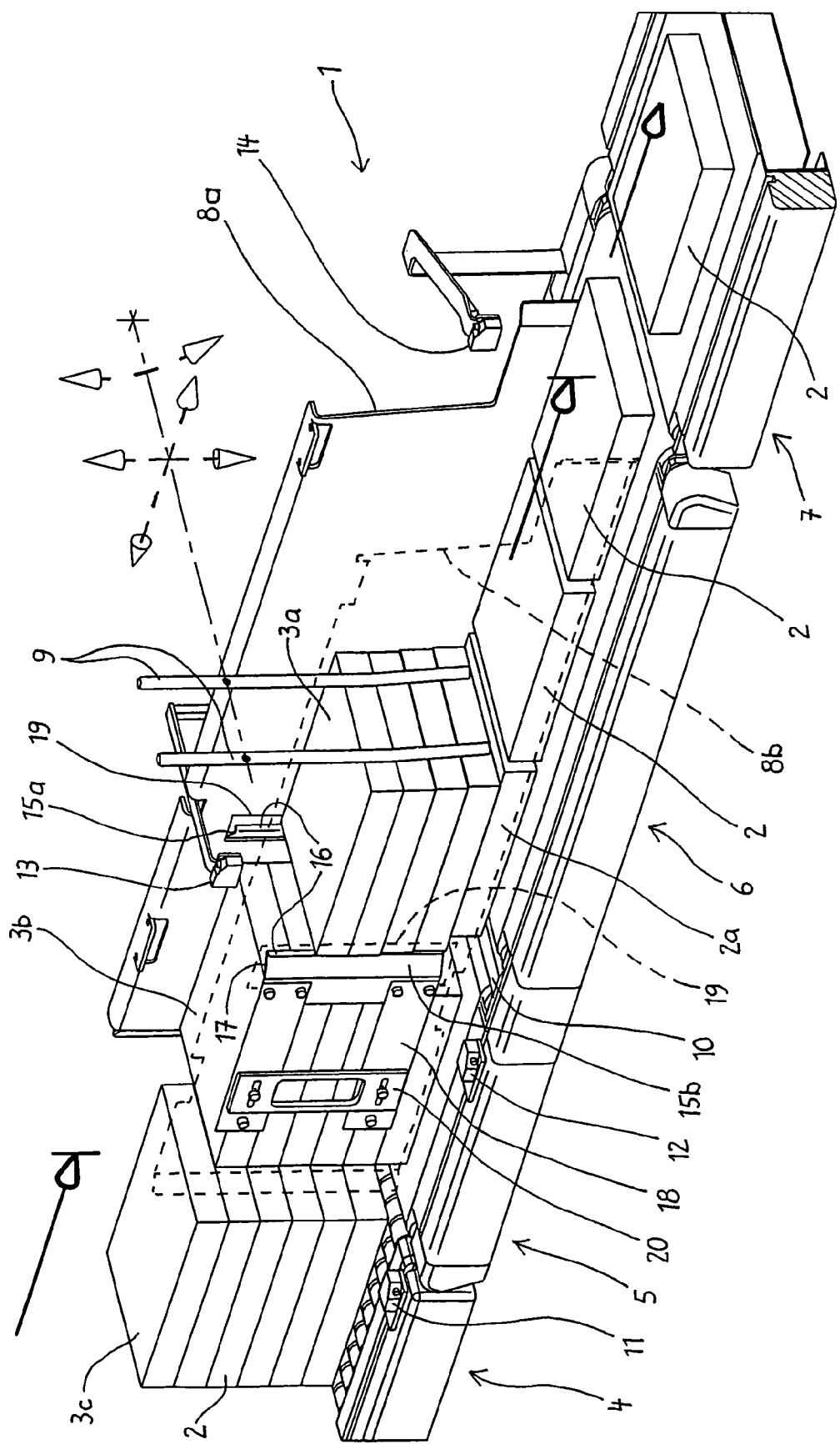

DEVICE FOR DESTACKING CUBIC PRINTED PRODUCTS

BACKGROUND

The present disclose pertains to a device for destacking books, brochures, book blocks or similar cubic printed products.

Destacking devices are used for separating stacked products such as books, brochures, book blocks or the like and delivering said products to a processing machine.

Known book block feeders feature a stacking tunnel for accommodating book blocks that are delivered individually or in stacks from a reservoir, e.g., an accumulating roller conveyor, wherein the stacking tunnel features an intermediate feeder in the form of supports that are oriented in the delivery direction and can be laterally moved out of the stacking tunnel in order to vertically set down the book blocks. The respective bottom book block in the stacking tunnel is pushed forward and transferred from a delivery conveyor to the infeed conveyor of the next machine. The systems are complicated and the infeed and the delivery of the book blocks inherently take place at different heights.

A destacking device of this type in the form of a book block feeder with constant infeed and delivery height is known from DE 198 11 635 A1, wherein the book block feeder comprises an endless separating belt with a non-skid surface that is powered by a frequency-controlled drive and successively receives the book block stacks, lateral boundaries for the book block stacks and a height-adjustable retaining element that forms a passage for the respective bottom book block to be separated. The retaining element can be inclined in the transport direction in order to appropriately alleviate the load on the book block to be separated and thusly improve the functional reliability during the separation.

The infeed of the separating belt is provided with a support plate for supporting the rear edge of the book block lying on the bottom book block relative to the separating belt while the bottom book block is pulled out. The aforementioned retaining element can be positioned relative to the separating belt in accordance with the format length of the book block. A feeding belt driven in a cyclic fashion is also assigned to the separating belt in order to deliver the next stack as far as the retaining element situated in the separating position of the separating belt.

The destacking device disclosed in DE 198 11 635 A1 makes it possible to quickly and easily destack book block stacks. However, when processing thick book blocks with a small format, the residual stack lying on the bottom book block may fall over rearward when the bottom book block is pulled out of a high stack.

SUMMARY

The embodiment disclosed is based on the objective of designing a device for destacking books, brochures, book blocks or similar cubic printed products in such a way that it has a simple construction and is able to process a broad format and thickness spectrum of the printed products to be destacked. It should be possible, in particular, to reliably and flawlessly separate thick book blocks with a small format from high stacks.

According to this embodiment, this objective is attained with the provision of at least one supporting element on the rear side of the stack that prevents a high stack from falling over when the respective bottom printed product is separated and thusly preserves its stacking order. The supporting element is situated at a defined distance behind the stack and enables the printed products of the residual stack to move downward in a rocking motion of sorts. The displaceable supporting element practically forms a magazine shaft that can be reliably loaded with high stacks and makes it possible to carefully handle the products due to the fact that the ensuing stacks are delivered on the transport level of the separating belt rather than conventionally dropped into the shaft. This results in an ergonomic feeding height and the manual feeding capacity can be significantly increased with the high stacks. When high stacks are removed from a buffer zone, the storage capacity thereof is significantly increased.

The at least one supporting element is preferably arranged on the lateral boundary. When separating longitudinally delivered printed products that are closed on one longitudinal edge only, the retaining element is positioned near the front corner of this longitudinal edge. The printed products adjoin the lateral guide with the diagonally opposite corner in this case such that only one supporting element arranged at this location already suffices. However, the destacking device preferably features supporting elements on both lateral boundaries such that all four corners of the stack are guided.

In one preferred embodiment, the supporting element features a strip-shaped supporting surface that is directed toward the rear side of the stack near the vertical stack edge and extends at least as far as the maximum stack height. This prevents, in particular, the top product from falling off.

A particularly simple device is realized if the supporting element automatically moves out of the transport path during the delivery of the next stack. Controlled movements are not required in this case. The supporting element is preferably held in the supporting position with the aid of a driving means that generates a spring force, wherein the supporting element is automatically moved into a retracted position outside the lateral boundary against the spring force by the next stack being delivered. This spring force can be adjusted such that sensitive printed products can also be processed. A cost-efficient driving means consists of one or more spring elements, preferably leaf springs—due to their space-saving properties—for moving the supporting element out of the transport path essentially transverse to the transport direction of the infeed and separating belts.

The automatic displacement of the supporting element during the delivery of the next stack can be easily realized in that the supporting element features a ramp that is directed toward the next stack on the side pointing away from the stack to be supported.

BRIEF DESCRIPTION OF THE DRAWING

One embodiment of the invention is described in greater detail below with reference to the drawing, which shows a perspective representation of a destacking device, in which a few of the mounting and adjusting elements were omitted in order to provide a better overview.

DESCRIPTION OF THE PREFERRED EMBODIMENT

The destacking device 1 may comprise an endless separating belt 6 with a non-skid surface that is powered by a frequency-controlled drive and successively receives the book block stacks 3a, b, c, lateral boundaries 8a, b for the book block stacks 3a, b and a height-adjustable retaining element 9 that forms a passage for the respective bottom book block 2a to be separated from the stack 3a. The right lateral boundary 8*b* was omitted in the figure for illustrative reasons and is merely indicated in the form of its contour that is drawn with broken lines.

The infeed of the separating belt 6 features a support plate 10 for supporting the rear edge of the book block 2 lying on the bottom book block relative to the separating belt 6 while the bottom book block 2*a* is pulled out. The retaining element 9 can be positioned relative to the separating belt 6 in accordance with the format length of the book block 2. It can also be appropriately tilted in the transport direction in order to alleviate the load on the book block 2*a* to be separated. The described adjustments of the retaining element 9 are symbolically illustrated in the form double arrows drawn with broken lines in the figure.

A feeding belt 5 driven in a cyclic fashion is assigned to the separating belt 6 in order to deliver the next stack 3*b* as far as the retaining element 9 situated in the separating position of the separating belt 6. The book block stack 3*b* is in a quasi standby position on the feeding belt 5. Additional book block stacks 3*c* are ready on an accumulating roller conveyor 4 that is either loaded manually or consists of a buffer that forms part of an interconnected production line.

Due to the separating principle, the separated book blocks 2 are arranged on the separating belt 6 in a row and spaced apart from one another by a short distance. Defined cyclic spacings of the book blocks 2 relative to one another can be realized in the form of a transfer to a faster conveyor belt 7. The start-stop operation of the separating belt 6 makes it possible to deliver the book blocks 2 to a downstream processing machine on demand.

The sequential control of the separating process is realized with light barriers 11 to 14. A first light barrier 11 is situated at the delivery end of the accumulating roller conveyor 4 and stops its transport if a book block stack 3*c* is detected at the delivery end while another book block stack 3*b* is still situated in its waiting position on the feeding belt 5. The latter-mentioned waiting position is defined by the light barrier 12. The book block stack 3*b* is delivered into the separating position of the separating belt 6 once the light barrier 13 no longer detects a book block 2 of the book block stack 3*a* to be separated. The light barrier 14 starts and stops the separating belt 6 so as to achieve a synchronous transfer of the separated book blocks 2 to a downstream processing machine.

According to the embodiment, respective supporting bars 15*a* and 15*b* are integrated into each lateral boundary 8*a, b* and protrude into the transport path of the book block stacks 3*a, b, c* through an opening 19 in the respective lateral boundaries 8*a* and *b*. The supporting bars 15*a, b* are fixed on leaf springs 18 that, in turn, are fixed on the outer sides of the lateral boundaries 8*a, b* and the spring force of which ensures that the respective supporting bar 15*a* or *b* is pressed into the transport path. The spring force of the leaf springs 18 can be adjusted with the aid of a displaceable adjusting plate 20.

The supporting bar 15*a* or *b* features a strip-shaped supporting surface 16 that is directed toward the rear side of the book block stack 3*a* near the vertical stack edge and extends as far as the maximum stack height. When the respective bottom book block 2*a* is pushed out, the book blocks 2 lying thereon fall rearward such that they lean against and slide down along the supporting surface 16 with their rear side. The stacking order is preserved, namely even for thick book blocks 2 with a small format.

During the delivery of the next stack 3*b*, the supporting bars 15*a, b* automatically move from the supporting position within the transport path of the book block stacks 3*a, b, c* into a retracted position outside the lateral boundaries 8*a, b*. This is realized in that the front stack edges of the book block stack 3*b* being delivered move onto a ramp 17 realized on the rear side of the respective supporting bars 15*a* and *b* such that the supporting bars 15*a, b* are moved out of the transport path essentially transverse to the transport direction of the infeed and separating belts 5 and 6 against the spring force generated by the leaf springs 18.

While a preferred embodiment has been shown and described, various modifications and substitutions may be made thereto. Accordingly, it is understood that the present embodiment has been described by way of illustration and not limitation.

The invention claimed is:

1. A device for destacking books, brochures or similar cubic printed products having a printed product format, by separating a bottom printed product from a printed product lying on top of the bottom printed product in a diminishing vertical stack of printed products, in which each of a series of delivered stacks has a front and a rear and each printed product has a top, a bottom, a front edge and a rear edge, comprising:

a separating belt moveable in a horizontal transport direction, having an infeed portion at its upstream end and powered by a controllable drive, for the separation of successive bottom printed product from a processing stack in a separating position on said supporting belt, by frictionally engaging the bottom of the bottom printed product and transporting the bottom printed product from the processing stack in the transport direction to thereby diminish the processing stack, while a next stack of said series of stacks is upstream of said separating position;

lateral boundaries that can be adjusted to the format and position of the processing stack on said separating belt;

a height-adjustable retaining element that forms a passage for the bottom printed product to be separated;

a support at said infeed portion of said separating belt for supporting only the rear edge of the printed product lying on top of the bottom printed product in the diminishing processing stack during separation of the bottom printed product;

a feeding belt horizontally aligned with the separating belt for horizontally delivering the next stack of printed product into the separating position on a delivery path along said horizontal transport direction; and at least one supporting element that extends laterally into said delivery path to a supporting position spaced at a defined distance horizontally upstream from and confronting the rear of all of the printed products in said processing stack when said processing stack is in said separating position, to be engaged by the rear of all of the printed products of said processing stack except said bottom product during horizontal backward movement of said processing stack as the bottom printed product is being separated by the separating belt, said at least one supporting element being laterally movable automatically out of said delivery path by contact with the front of the next stack as the next stack is delivered into the separating position.

2. The device according to claim 1, wherein the at least one supporting element is arranged on a lateral boundary.

3. The device according to claim 1, wherein one of said at least one supporting element is respectively arranged on each of said lateral boundaries.

4. The device according to claim 1, wherein said at least one supporting element includes a strip-shaped supporting surface that is directed toward the rear of the stack near the vertical stack edge and extends at least as far as the maximum stack height.

5. The device according to claim 1, wherein one of said at least one supporting element is respectively arranged on each of said lateral boundaries and each supporting element includes a strip-shaped supporting surface that is directed toward the rear of the stack near the vertical stack edge and extends at least as far as the maximum stack height.

6. The device according to claim 1, wherein each of said at least one supporting element is held in the supporting position by means for generating a spring force and all held supporting elements can be moved into a retracted position outside the lateral boundaries against the spring force by a next stack being delivered into the separating position.

7. The device according to claim 6, wherein one of said at least one supporting element is respectively arranged on each of said lateral boundaries, each supporting element includes a strip-shaped supporting surface that is directed toward the rear of the processing stack near the vertical stack edge and extends at least as far as the maximum stack height.

8. The device according to claim 6, wherein said spring force is adjustable.

9. The device according to claim 7, wherein said spring force is adjustable.

10. The device according to claim 6, wherein said means for generating a spring force comprises at least one spring element.

11. The device according to claim 7, wherein said means for generating a spring force comprises at least one spring element.

12. The device according to claim 10, wherein each said spring element consists of a leaf spring on which the supporting element is fixed.

13. The device according to claim 11, wherein each said spring element consists of a leaf spring on which the supporting element is fixed.

14. The device according to claim 1, wherein each of said at least one supporting element includes a ramp that is directed toward the next stack.

15. The device according to claim 6, wherein each of said at least one supporting element includes a ramp that is directed toward the next stack.

16. The device according to claim 7, wherein each of said at least one supporting element includes a ramp that is directed toward the next stack.

17. The device according to claim 10, wherein each of said at least one supporting element includes a ramp that is directed toward the next stack.

* * * * *